United States Patent
Guyomard et al.

Patent Number: 5,357,392
Date of Patent: Oct. 18, 1994

[54] MOTOR DRIVE DEVICE COMPRISING A TACHO-GENERATOR THAT CAN BE CONFIGURED AS A BACK-UP MOTOR

[75] Inventors: Patrick Guyomard, Paris; Marc Audion, Massy; Jean Rambeaud, Issy les Moulineaux; Philippe Riviere, Paris, all of France

[73] Assignee: Thomson-CSF, Puteaux, France

[21] Appl. No.: 911,069

[22] Filed: Jul. 9, 1992

[30] Foreign Application Priority Data

Jul. 9, 1991 [FR] France .................. 91 08602

[51] Int. Cl.$^5$ ................................ H02K 23/36
[52] U.S. Cl. ........................ 361/23; 361/33; 361/51
[58] Field of Search ............ 361/23, 24, 20, 52, 361/51, 33; 318/564, 616, 565, 561; 244/194; 310/127, 136

[56] References Cited

U.S. PATENT DOCUMENTS

| | | | |
|---|---|---|---|
| 4,162,438 | 7/1979 | Osoer | 318/564 |
| 4,948,998 | 8/1990 | Fink et al. | 310/127 |
| 5,054,917 | 10/1991 | Pepin et al. | 356/152 |
| 5,071,226 | 12/1991 | Audion et al. | 359/832 |

FOREIGN PATENT DOCUMENTS

| | | | |
|---|---|---|---|
| 0417956 | 9/1990 | European Pat. Off. | H02K 7/20 |
| 1913843 | 11/1970 | Fed. Rep. of Germany | H02P 5/00 |
| 2205004 | 5/1987 | United Kingdom | H02K 5/22 |

OTHER PUBLICATIONS

Patent Abstracts of Japan, vol. 6, No. 211 (E-137) (1089) Oct. 23, 1982 & JP-A-57 113 751, Jul. 15, 1982.
Patent Abstracts of Japan, vol. 9, No. 201 (E-336) (1924) Aug. 17, 1985 & JP-A-60 066 680, Apr. 16, 1985.

Primary Examiner—A. D. Pellinen
Assistant Examiner—S. Jackson
Attorney, Agent, or Firm—Pollock, Vande Sande & Priddy

[57] ABSTRACT

Disclosed is a motor drive device with tacho-generator that can be configured as a back-up motor. This device is designed for the driving of a movable element. It comprises an electrical rotor motor with supply coil, associated with a tachometric sensor inducing an electrical current in at least one electrical coil, a regulator circuit controlling the speed and the position of the electrical motor as a function of the servo signal delivered by said electrical coil and applied to the supply coil. This device further comprises means to continue the driving of the movable element in the event of the malfunctioning of the electrical motor or of its electrical supply. These means to continue the driving of the movable element are constituted by a failure detection circuit which, in the event of failure, activates switching means to connect the electrical coil of the tachometrical sensor to an electrical supply source. Application: improvement of the safety of a motor drive mechanism.

7 Claims, 1 Drawing Sheet

MOTOR DRIVE DEVICE COMPRISING A TACHO-GENERATOR THAT CAN BE CONFIGURED AS A BACK-UP MOTOR

FIELD OF THE INVENTION

1. Field of the Invention

The present invention relates to a motor drive device designed for the driving of a movable element comprising an electrical motor driving a tacho-generator that can be configured as a back-up motor. A motor drive device of this kind is conventionally coupled to a regulation circuit which controls the speed and the position of the electrical motor as a function of the servo signal delivered by the electrical coil of the tachometrical sensor.

2. Description of the Prior Art

When the safety requirements are particularly strict, for example, in the aeronautics and space sectors or in industrial sectors such as that of nuclear energy production, those skilled in the art naturally make provisions for a redundancy of the critical functions by the duplication or even the triplication of certain components. This method is admittedly one that has been tested and is relatively easy to design. However, these advantages are offset by an increase in weight that is detrimental to certain applications, a significant increase in the space occupied and, naturally, extra cost. Furthermore, the management of the redundant components and systems leads to increasing complexity of the control of the functions to be backed up.

The aim of the present invention is to overcome these drawbacks by proposing a motor drive device, the probability of failure of which is substantially identical to that of a prior art device provided with a back-up motor, and the manufacturing cost, weight and space requirements of which are substantially smaller.

SUMMARY OF THE INVENTION

The present invention relates to a motor drive device with tacho-generator that can be configured as a back-up motor, said device being designed for the driving of a movable element and being of the type comprising an electrical rotor motor with supply coil, associated with a tachometrical sensor inducing an electrical current in at least one electrical coil, a regulator circuit controlling the speed and/or the position of the electrical motor as a function of the servo signal delivered by said electrical coil and applied to the supply coil. The device comprises means to continue the driving of the movable element in the event of the malfunctioning of the electrical motor or of its electrical supply, said means being constituted by a failure detection circuit which, in the event of failure, activates switching means to connect the electrical coil of the tachometrical sensor to an electrical supply source.

The principle of the invention therefore consists in using the tacho-generator as a back-up motor in event of malfunctioning of the main motor or of its supply system.

According to a preferred embodiment of the invention, the control circuit furthermore disconnects the electrical motor in the event of malfunctioning of the main motor or of its supply. This embodiment makes it possible to avoid disturbances in the back-up system when the main motor works abnormally but continues to give a motor torque or a braking torque.

According to one variant, the circuit furthermore comprises means to stop the driving of the movable element by the tachometrical sensor when the movable element occupies a predetermined resting position. This embodiment prevents the situation in which the movable element remains in a hazardous or inappropriate position in the event of failure of the motor or of the regulation stage, in the main supply circuit and at the connections. The device according to this variant is aimed at ensuring that the movable element is in a back-up position corresponding, for example, to a limit stop or to a stop in any position that is constant or changes as a function of certain parameters, such as the amplitude of the vibrations and of the motions of the rest of the equipment.

Advantageously, the connection of the electrical coil to an electrical supply as a function of a signal delivered by a failure detecting element is done by an electrical relay.

The relay coil could be inserted into the supply circuit of the main motor. Thus, a break in the supply will prompt the tripping of the relay into a state of rest in which it provides for the electrical supply of the tachometrical coil and, possibly, the disconnection of the coil of the main motor. Naturally, it is also possible to provide for a more elaborate control of the relay that implements, for example, a multiple failure detection electronic module or a software for the autonomous monitoring of a complex system.

According to a particular embodiment, the electrical motor comprises a rotor and an integrated tachometrical sensor constituted by an electrical coil detecting the flux variations induced by a rotor having a plurality of adjacent pole pieces magnetized in alternating directions.

This embodiment makes it possible to avoid the need for a mechanical link between the main motor and the tachometrical sensor and to reduce the cost of manufacture and the weight as well as the space occupied by the device while preventing the duplication of certain parts common to the main motor and to the sensor such as the rotor or the stator.

According to a particular embodiment, the movable structure is shaped like a disk comprising transversally magnetized zones.

According to another particular embodiment, the movable structure is tube-shaped and has radially magnetized zones.

BRIEF DESCRIPTION OF THE DRAWINGS

The invention shall be understood more clearly from the following description of particular embodiments, made with reference to the appended drawings, of which.

DETAILED DESCRIPTION OF THE INVENTION

Figure 1:
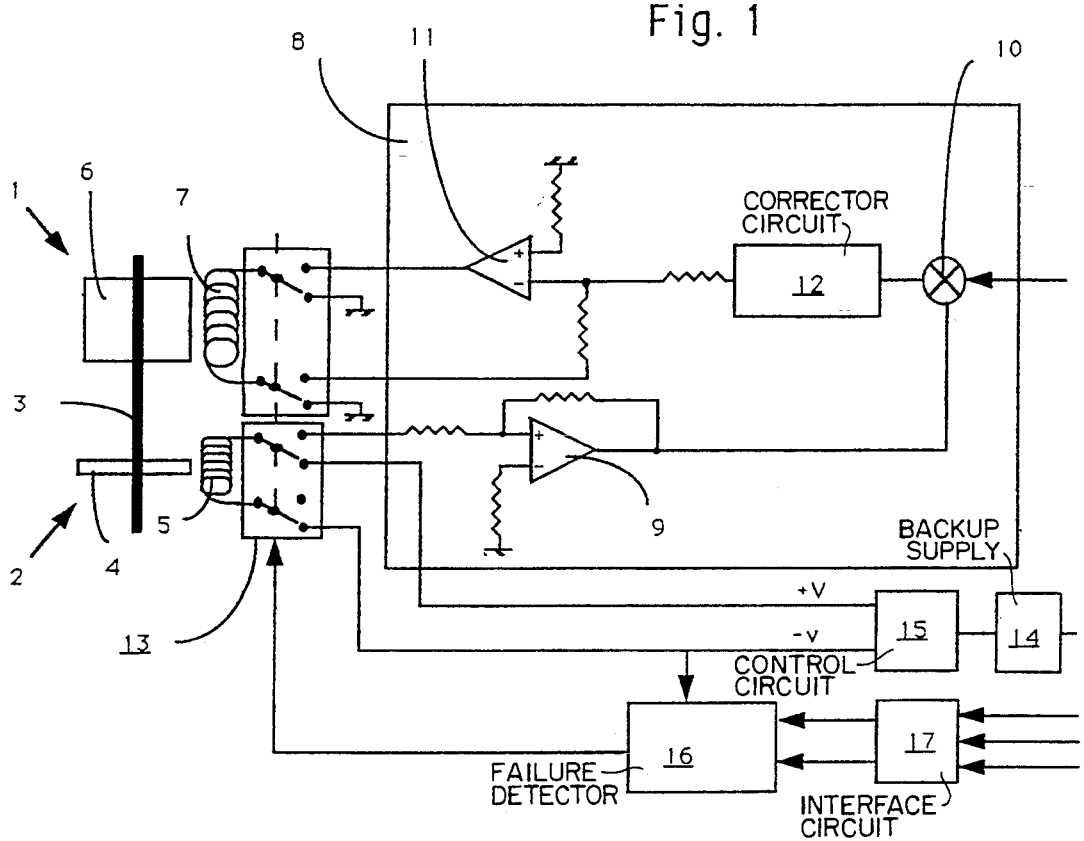
FIG. 1 shows a schematic view of the device according to the invention.

The motor drive device shown schematically in FIG. 1 comprises a motor (1) and a tachometrical sensor (2) coupled by a shaft (3). The tachometrical sensor (2) comprises a rotor (4) inducing an electrical current in the coil (5) when it is driven by the coupling shaft (3).

The motor (1) also has a rotor (6) associated with coils (7) creating an electromotive force when they are supplied.

In normal operation, the coil (7) of the electrical motor (1) is supplied by a servo circuit (8) constituted by a current-looped power amplifier. The servo circuit (8) receives a voltage coming from the coil (5) of the tachometrical sensor (2). This voltage is applied to the input of an operational amplifier (9). A summator (10) loops the information coming from the tachometrical sensor (2). A second operational amplifier (11) generates the supply voltage of the coil (7) of the electrical motor (1) after the signal coming from the summator (10) has been processed by a corrector circuit (12). The connection, firstly, of the coil (7) of the motor (1) with the output of the servo circuit (8) and, secondly, of the coil (5) of the tachometrical sensor (2) with the input of the servo circuit (8) is done by means of a relay (13). Should there be no failure, this relay places the coil (7) of the electrical motor (1) in contact with the output of the servo circuit (8), and also places the coil (5) of the tachometrical sensor (2) in contact with the input of the servo circuit (8).

In the event of abnormal functioning, i.e. should there be a failure of the electrical motor (1) or of its supply, the relay (13) gets tripped into the position shown in FIG. 1, corresponding to a resting position, in which the coil (7) of the electrical motor (1) is grounded so as to eliminate any motor torque coming from the electrical motor (1).

Furthermore, the coil (5) is implemented with a back-up supply (14) independent of the main supply. The tachometrical sensor is consequently converted into an electrical motor. A control circuit (15) controls the motions generated by the tachometrical sensor, for example as a function of information elements coming from a limit stop detector.

This relay (13) is activated by a failure detection circuit. This failure detection circuit (16) causes the relay (13) to go into the resting position when the signals arriving at an interface circuit (17) reveal a malfunctioning in the main supply of the electrical motor (1), its servo regulator circuit (8) or the electrical motor (1) itself. The information elements may come from cards, control packages or modules or any type of autonomous monitoring software programs in common use.

Figure 2:
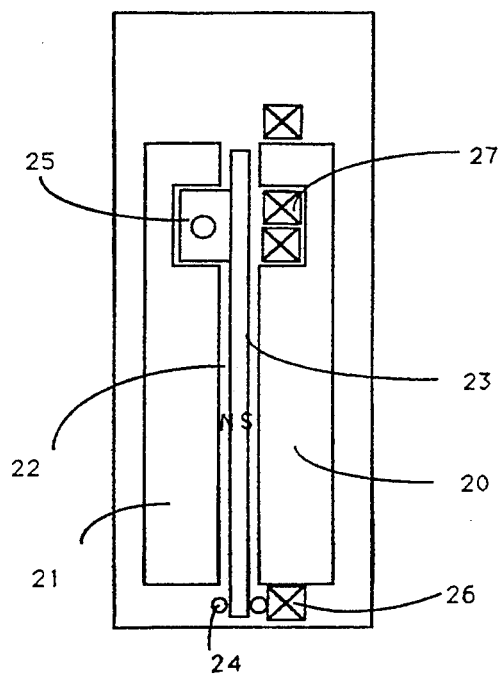
FIG. 2 shows a sectional view of a particular embodiment.

FIG. 2 shows a sectional view of a particular exemplary embodiment. The device is constituted by a plane rotor motor providing a linear motion.

The device has two stator parts (20, 21) demarcating a gap (22) within which there moves a rotor (23) in a direction perpendicular to the sectional plane of FIG. 2. This rotor (23) is constituted by at least one thin magnet having two zones magnetized in opposite directions (N and S). It is guided at one end by ball bearings (24) and at the other end by a guiding rod (25) which furthermore drives the movable element with which the device is associated.

The stator structure (20) comprises a main coil (26) providing for the positioning of the rotor as well as its shifting. A second electrical coil (27), which is smaller in size, generates a servo voltage. In the event of the malfunction of the electrical motor or of its supply, the coil (27) may be linked with a back-up supply source by means of a relay, as shown in FIG. 1, or by any other appropriate switching means known to those skilled in the art.

Figure 3:
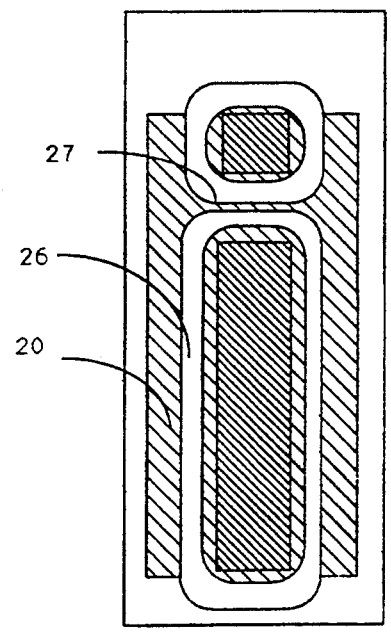
FIG. 3 shows a front view of the stator structure provided with these coils.

FIG. 3 shows a front view of the stator structure. The stator (20) has housings for the positioning of the electrical coils (26, 27).

The device according to the present invention has numerous applications, especially in the field of aeronautics where safety needs are important and where the constraints of weight are critical. The applications relate especially to any device for the control of a mechanism coming into play in the operation of the aircraft. More especially, they relate to optronic instruments which, firstly, are becoming increasingly numerous in aircraft such as airplanes and helicopters and, secondly, are playing a growing role in basic piloting functions.

One example that can be cited is that of motorization of the projecting part of the nose of the aircraft designed to house optronic equipment. This projecting part is preferably retractable for the phases of landing on the ground or on an aircraft carrier. It is clear that, for safety reasons, the retractable projecting part should be in a withdrawn position in the event of a failure of the drive motor or of its supply. The device according to the invention enables this problem to be resolved in an optimal and reliable manner.

Another exemplary application relates to helmet visors designed for helicopter pilots. In the case of night flying, the helmet visor projects an image, coming from a sensor mounted in the pod, to the pilot's eye. In the event of malfunctioning of the pod, it is imperative that this image should return to a sighting position in the axis and that it should remain there in order to enable piloting with axial vision. The device according to the invention is particularly well suited to providing for the mechanical driving of the sighting system and ensuring the return to the axial position in the event of failure.

Another application relates to optronic equipment such as the motorization of the movements of mirrors or lenses on the optical path, protection flaps or calibration mechanisms. In the event of failure, it is preferable for the movable element to be repositioned on a limit stop so that the sensor can continue to receive the optical rays that enable a useful signal to be delivered, even if the conditions are no longer the optimal ones. The motorization of such elements is advantageously provided by the devices according to the invention.

These exemplary applications are not restrictive, and there are many other sectors of industry, such as the sectors of robotics or machine tools, where the safety of the operators or more simply the safety of the manufacturing method in progress are of critical importance.

Those skilled in the art will moreover be capable of achieving numerous variants of the invention without going beyond the scope of the invention for all that. In particular, they will be capable of achieving numerous variants of electrical motors integrating a coil that is capable of fulfilling a tachometrical function in normal mode and a motor function in the event of failure of the main motor. Similarly, those skilled in the art will be capable of achieving numerous variants of the coupling of a motor and a sensor capable of implementing the invention.

What is claimed is:

1. A fail safe motor drive system having a convertible tachometer, the system comprising:
   a single motor having a supply winding, and a rotor connected to a movable part;
   a single tachometer having a sensing winding and coupled to the motor rotor;

a regulator circuit connected between the output of the tachometer sensing winding and the motor supply winding for creating a servo loop therebetween;

a failure detection circuit interfacing with the regulator circuit for detecting failure of the motor;

a power supply; and switching means responsive to a signal from the failure detection circuit for switching the sensing winding of the tachometer across the power supply thereby converting the tachometer to a motor mode that continues to drive the movable part in the event of a motor failure.

2. The drive system set forth in claim 1 further comprising:

grounded terminals connected to the switching means for grounding the motor supply windings in the event of a motor failure.

3. The drive system set forth in claim 1 together with means connected to the sensing winding of the tachometer, when the tachometer operates in the motor mode, for controlling the displacement of the moveable part by the tachometer during failure of the motor.

4. The drive system set forth in claim 1 wherein the switching means is a relay, switchable between two states, dependent upon the output of the failure detection circuit.

5. The drive system set forth in claim 1 wherein the tachometer and the motor are integrally formed as a single unit further comprising:

a common rotor connected to the moveable part; and
a common stator;
the tachometer and motor windings being wound on the common stator.

6. The drive system set forth in claim 1 wherein the stator is further comprised of two oppositely positioned stator parts, separated by a uniform gap that receives the rotor, the rotor further being a member having a plurality of magnetized zones.

7. A fail safe motor drive system having a convertible tachometer, the system comprising:

a single motor having a supply winding, and a rotor connected to a movable part;

a single tachometer having a sensing winding and coupled to the motor rotor;

a regulator circuit connected between the output of the tachometer sensing winding and the motor supply winding for creating a servo loop therebetween;

a failure detection circuit interfacing with the regulator circuit for detecting failure of the motor;

a power supply;

switching means responsive to a signal from the failure detection circuit for switching the sensing winding of the tachometer across the power supply thereby converting the tachometer to a motor mode that continues to drive the movable part in the event of a motor failure;

grounded terminals connected to the switching means for grounding the motor supply windings in the event of a motor failure;

means connected to the sensing winding of the tachometer, when the tachometer operates in the motor mode, for controlling the displacement of the moveable part by the tachometer during failure of the motor;

the tachometer and the motor being integrally formed as a single unit further including;

a common rotor connected to the moveable part; and
a common stator;
the tachometer and motor windings being wound on the common stator.

* * * * *